United States Patent
Yao et al.

[11] Patent Number: 6,097,697
[45] Date of Patent: Aug. 1, 2000

[54] CONGESTION CONTROL

[75] Inventors: Jie Yao, Newton; Thomas Goetz, Foxboro, both of Mass.

[73] Assignee: Sitara Networks, Inc., Waltham, Mass.

[21] Appl. No.: 09/118,400

[22] Filed: Jul. 17, 1998

[51] Int. Cl.[7] .................................................. H04J 3/14
[52] U.S. Cl. ........................................ 370/230; 370/232
[58] Field of Search ................................ 370/229–236, 370/252, 253

[56] References Cited

U.S. PATENT DOCUMENTS 5,633,861  5/1997  Hanson et al. ........................... 370/232
5,650,993  7/1997  Lakshman et al. ...................... 370/236
5,901,138  5/1999  Bader et al. ............................. 370/229

OTHER PUBLICATIONS

Carey L. Williamson, "Dynamic Bandwidth Allocation Using Loss–Load Curves", IEEE/ACM Transactions on Networking, vol. 4, No. 6, pp. 829–839, Dec. 1996.

*Primary Examiner*—Melvin Marcelo
*Attorney, Agent, or Firm*—Fish & Richardson P.C.

[57] ABSTRACT

A new approach to congestion control includes features which overcome many of the limitations of the current congestion control approaches. The new approach uses a rate-based congestion control mechanism which uses a combination of multiple indicators of congestion. The transmission rate is decreased when there is an indication of congestion and the rate is increased when there is an indication of little or no congestion. The approach can also limit the transmission rate of multiple data streams destined to the same network node.

18 Claims, 7 Drawing Sheets

CONGESTION CONTROL

BACKGROUND OF THE INVENTION

This invention relates to network communication protocols, such as communication protocols used in the Internet.

Internet communication is based on a layered model of communication protocols consistent with that published by the International Standards Organization (ISO). The set of ISO protocol layers, or protocol stack, is numbered from one, at the lowest layer, to seven, at the application layer.

Communication over the Internet is based on packet-switching techniques. Addressing and transport of individual packets within the Internet is handled by the Internet Protocol (IP) corresponding to layer three, the "network" layer, of the ISO protocol stack. This layer provides a means for sending data packets from one host to another based on a uniform addressing plan where individual computers have unique network addresses. By making use of the IP layer, a sending computer is relieved of the task of finding a route to the destination host. However, packets may be lost or damaged due to random errors on data links or as a result of congestion within the network. Also, a sending host may be able to provide data packets at a higher rate than can be accepted by a destination host, or than can be accepted by intermediate nodes or links of the network, thereby contributing to congestion within the network. The sending host is generally responsible for limiting its rate of transmissions to avoid congestion in the network. This limiting of transmissions is implemented in software layered above the network layer.

At the next layer of the ISO protocol stack above the network layer, a transport layer (layer four) protocol provides end-to-end communication between applications executing on different computers and regulates the flow of information between those applications. Rate control and error control are two examples of regulations of the flow of information. Rate control addresses the rate at which data is transmitted into the network. In particular, rate control is one approach to congestion control. Error control addresses reliable delivery, for instance, providing error-free and in-sequence delivery of data packets.

Today, the Transmission Control Protocol (TCP) is used almost exclusively to provide end-to-end reliable (i.e., error free) data streams between computers over the Internet. In the Internet, TCP is layered on the IP network layer protocol. Software supporting use of the TCP protocol is provided on most popular operating systems, such as Microsoft Windows 95 and Windows NT, and most variants of Unix. An application using TCP is relieved of the details of creating or maintaining a reliable stream to a remote application and simply requests that a TCP-based stream be established between itself and a specified remote system.

The success of TCP during last 20 years is due, at least in part, to its stable end-to-end congestion control mechanism. TCP uses a window-based (or equivalently a credit-based) congestion control mechanism on each connection. For each connection, TCP limits the number of bytes than can be sent that have not been acknowledged. In general, TCP implementations send as much data as possible, as soon as possible, without exceeding the congestion window. TCP then waits for an acknowledgment of data in the window, or expiration of a timeout period, before it sends more data. The TCP congestion control mechanism adapts to network conditions by dynamically modifying the size of the congestion window. In general, the window is reduced quickly when packets are not delivered successfully. The window is increased slowly up to a maximum during periods when data is successfully delivered.

SUMMARY

In a general aspect, this invention provides a new approach to congestion control. This new approach includes features which overcome many of the limitations of the current congestion control approaches. For instance, the new approach uses a rate-based congestion control mechanism which uses a combination of multiple indicators of congestion. The transmission rate is decreased when there is an indication of congestion and the rate is increased up to a predetermined maximum rate when there is an indication of little or no congestion. The approach can also limit the transmission rate of multiple data streams destined to the same network node.

In one aspect, in general, the invention is a method for congestion control in a data communication network by controlling a transmission rate a source of data transmits data onto a data network. The method features deriving multiple statistics from data communication from the source to a destination, the statistics providing indications of congestion on the data network. For instance, the statistics can include indicators of congestion such as a rate and a pattern of packet loss. The method also features adjusting the transmission rate to the destination in response to a combination of the derived statistics.

The method can also feature forming a group of data streams for transmission from the source, transmitting data from the group of data streams, and accepting acknowledgments of receipt of the transmitted data. As part of deriving the statistics related to delivery of the data transmitted from the source, the transmissions of the data and the acknowledgments of receipt of the data can be monitored. The group of data streams can be formed so that they have a common destination on the data network, for example having a common host address on the Internet.

The method can include one or more of the following features.

The method can include computing a maximum transmission rate as a function of the multiple statistics and then limiting the transmission rate to the computed maximum transmission rate.

The statistics can include a rate of data loss and a pattern of data loss. In addition, the pattern of data loss can include lengths of sequences of lost data.

Adjusting the transmission rate can be performed in each of a sequence of time intervals.

In another aspect, in general, the invention is software stored on a computer readable medium. The software is for causing a computer to perform functions featuring deriving multiple statistics from data communication from a source of data over a data network to a destination. The statistics provide indications of congestion of the data network. The functions also feature adjusting a transmission rate from the source to the destination in response to a combination of the derived statistics.

In another aspect, in general, the invention is a congestion control apparatus. The apparatus features a rate updater for determining a maximum rate of data transmission to a destination over a data network. The rate updater determines the maximum rate using a combination of a plurality of statistics derived from communication with the destination. The apparatus also features storage associating the destination with determined maximum rate and a transmission throttle from limiting a rate of data transmission to the destination based on the stored maximum rate.

Aspects of the invention include one or more of the following advantages.

Use of a congestion control mechanism which is separate from error control mechanisms allows maintaining high throughput for applications which can tolerate a modest error rate.

The rates of a group of connections to a common destination can be controlled together. Patterns of packet loss are monitored on the group of streams, thereby providing improved indicators of congestion compared to indicators based soley on the individual data streams.

Also, by not assuming that all packet loss is due to congestions, the invention can provide high throughput networks with relatively high random data loss (e.g., greater than 1% loss), such as is typical on some wireless data networks. Furthermore, data sent according to this invention can be less bursty than using other congestion control approaches, thereby improving overall network performance.

Other features and advantages of the invention will be apparent from the following description, and from the claims.

DESCRIPTION

Figure 1:
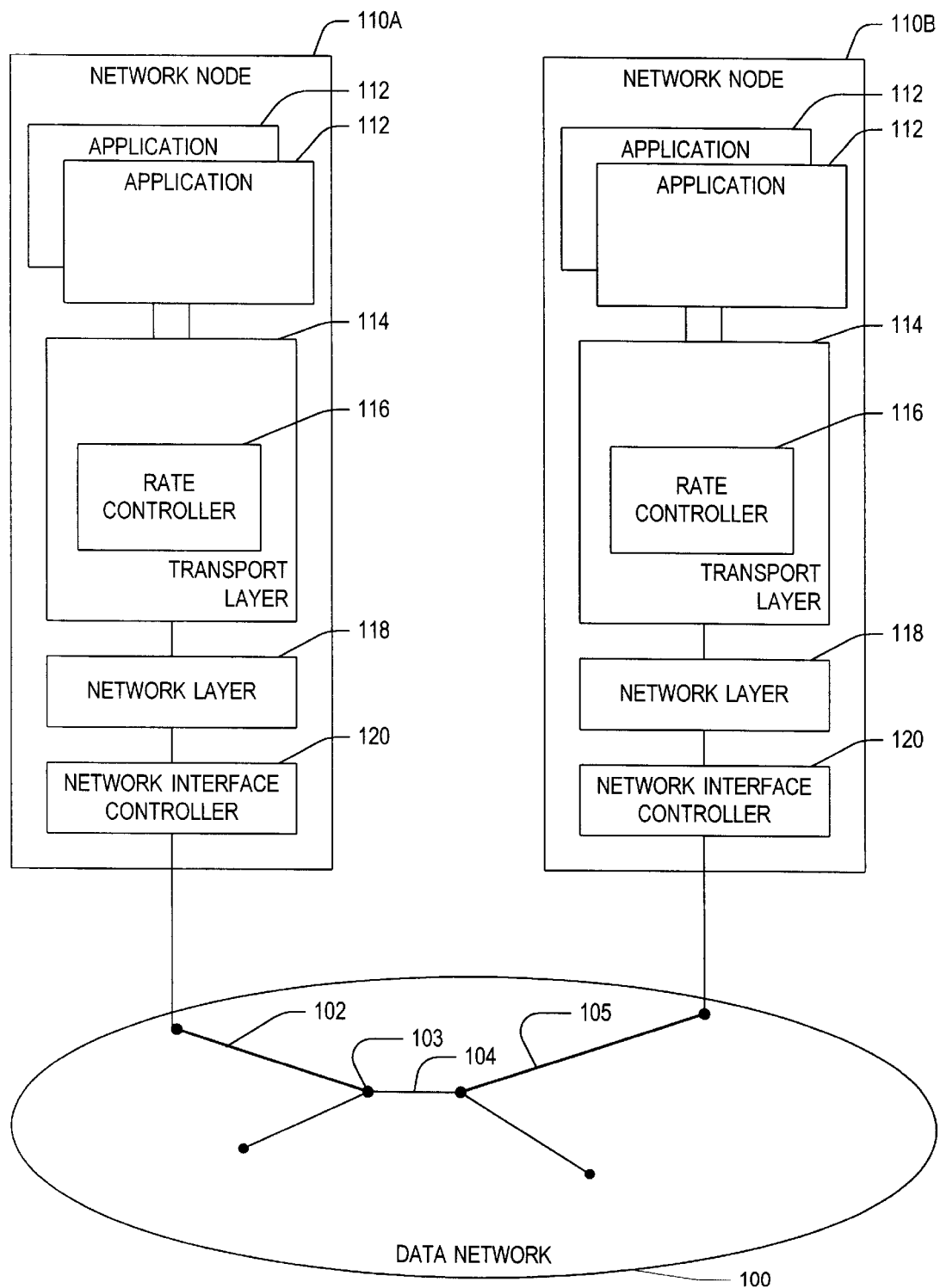
FIG. 1 shows two network nodes coupled through a data network.

Referring to FIG. 1, two network nodes (i.e., general or special purpose computers) 110A and 110B are coupled through a data network 100. Communication passing between the network nodes, in general, passes over multiple links in data network 100. For instance, in the exemplary data network shown in FIG. 1, communication passing from network node 110A to network node 110B passes over links 102, 104, and 106. Congestion in data network 100 can occur for a variety of reasons. For instance, congestion can occur at intermediate points in the network. In this example, link 104 has relatively lower capacity than links 102 and 106, or must share a comparable capacity with data arriving from other links. Therefore, if data passes over link 102 at the full rate supported by that link, the data must be queued at intermediate point 103 before passing over link 104 at a lower rate. Because the queue at point 103 has a bounded capacity, if network node 110A continues to send at a high rate, some of that data will eventually be lost at point 103 when its queue overfills. When data is lost in this way, in general, a series of data packets sent from network node 110A will be lost.

In each network node 110A, 110B software modules include one or more applications 112 each of which can establish multiple data streams with other applications through a transport layer 114. Transport layer 114 in turn communicates with a network layer 118 to support communication between applications on different network nodes. Each network layer communicates with a corresponding network interface controller 120 which provides a physical connection to data network 100. Using these components, an application 112 on network node 110A can communicate with an application 112 on network node 110B.

Transport layer 114 include a rate controller 116. Rate controller is used to limit the rate that packets are sent over a connection between applications on different network nodes. Rate controller 116 on a network node separately limits the total data transmission rate of all data streams from applications on that network node to each remote network node. In the situation described above in which data arrives over link 102 at a rate higher than can be accepted by link 104 and data is dropped, rate controller 116 at node 110A is designed with the goal of reducing the rate that data is sent over link 104 thereby relieving the congestion at point 103.

Congestion Indicators

Figure 2:
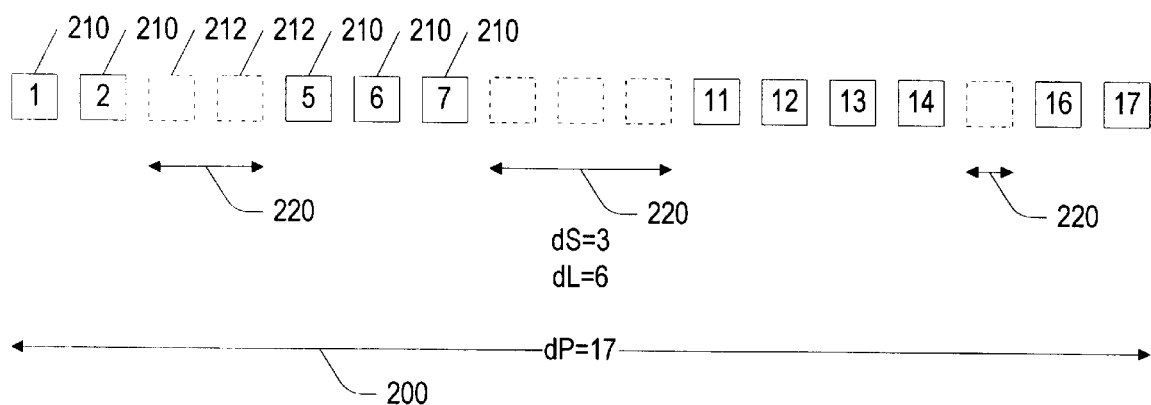
FIG. 2 illustrates a sequence of packets with multiple spans of packet loss.

Rate controller 116 adapts the transmission rate based on multiple indicators of congestion. Not only is an average rate of packet loss used, but the pattern of those losses is also used. Referring to FIG. 2, a sequence of packets 200 sent by one node to another is illustrated. The sequence of dP=17 packets includes successfully received packets 210, illustrated as solid squares, and dL=6 lost or damaged packets 212, illustrated as broken squares. The lost or damaged packets occur in dS=3 "loss spans," each of which is a consecutive subsequence of lost packets. Rate controller 116 computes two statistics for such a sequence of sent packets 200. The first is a loss rate, L, which is the fraction of packets that are lost in the sequence. In this exemplary sequence, L=6/17=0.35. The second statistic relates to the pattern of loss. Rate controller 116 computes a "cluster loss ratio," $L_S$, defined as the ratio of the number of loss spans to the number of lost packets. In this exemplary sequence, $L_S$=3/6=0.50. Note that $L_S$ is close to 1 if the pattern of packet loss is "random" consisting of isolated lost packets. On the other hand, $L_S$ is small if the pattern of loss consists of long subsequences of consecutive lost packets. Long subsequences of lost packets are an indication of congestion in the network. For instance, an overfull buffer at an intermediate node in the network will not accept new data until it has cleared its backlog. Therefore, in general, multiple sequential packets arriving at that intermediate node will be lost.

Rate controller 116 also uses a longer-term statistic of packet loss. Specifically, an average rate of packet loss, $L_0$, is tracked. Packet loss in a particular sequence is expected to be close to $L_0$ if the loss is due to random errors, such as errors on a data link. Rate controller 116 uses the amount by which the packet loss rate differs the average loss rate as an indication of congestion or lack of congestion.

Rate Adjustment

Rate controller 116 repeatedly adjusts the packet transmission rate, R (packets per second), based on the sequence of packets sent since the last adjustment of rate. Based on the rate and pattern of packet loss, rate controller 116 either increases R, decreases R, or leaves R unchanged.

Figure 3:
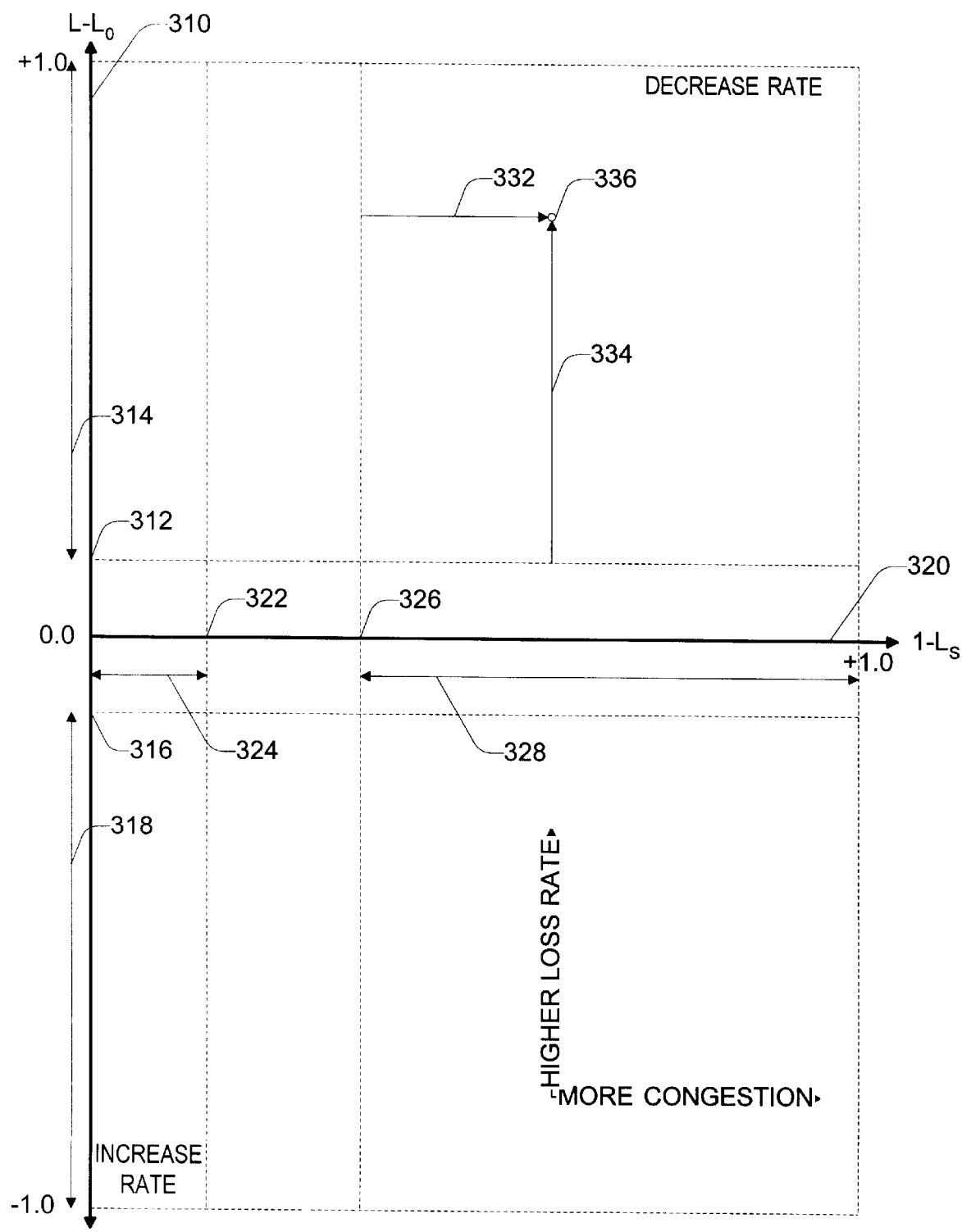
FIG. 3 shows ranges of two statistics used to compute transmission rate changes.

Referring to FIG. 3, rate controller computes an excess loss rate, $L-L_0$, and a loss ratio, $1-L_S$, in order to adjust the transmission rate. These two quantities are illustrated in a two-dimensional plane with axes 310 and 320. Note that $L-L_0$ can range from −1.0 to 1.0 while $1-L_S$ can ranges from 0.0 to 1.0. When $L-L_0$ is close to 1.0, the loss rate is high relative to a low average loss rate. When $1-L_S$ is close to 1.0, lost packets occur in relatively long spans, indicating congestion. When $L-L_0$ is close to −1.0, the loss rate is low relative to a high average loss rate. When $1-L_S$ is close to 0.0, lost packets occur in relatively short spans. In general, when the loss rate is high and the loss spans are long (i.e., the top right region of the graph), rate controller 116 decreased the transmission rate. When the loss rate is low and the spans are short (i.e., the lower left region of the graph), rate is generally increased.

Two ranges are defined for each variable. On the excess loss rate axis 310, a loss hysteresis threshold (LOSS_HYST) 312 defines a range 314 between LOSS_HYST and 1.0. In this range, an excess loss rate contributes to a decrease in transmission rate. The negative of the loss hysteresis threshold (-LOSS_HYST) 316 defines a range 318 from -LOSS_HYST to -1.0 in which the excess loss rate contributes to an increase in transmission rate.

On loss ratio axis 320, an upper span loss ratio threshold (UPPER_SPAN_THRESH) 326 defines a range 328 between UPPER_SPAN_THRESH and 1.0 in which a loss ratio contributes to a decrease in transmission rate. A lower span loss ratio threshold (LOWER_SPAN_THRESH) 322 defines a range 324 between 0.0 and LOWER_SPAN_THRESH in which a loss ratio contributes to an increase in transmission rate.

A value of 0.06 for HYST_THRESH, and values of 0.09 and 0.286 for LOWER_SPAN_THRESH and UPPER_SPAN_THRESH, respectively, have been used successfully.

In some ranges of values of the two variables, for example, when the excess loss rate is greater than HYST_THRESH (i.e., in range 314) and the loss ratio is less than LOWER_SPAN THRESH (i.e., in range 316) the excess loss rate and the loss ratio contribute to decreasing and increasing the rate, respectively. The relative contributions of these two factors determine whether the transmission rate is in fact increased or decreased. Similarly, when the excess loss rate is less than -HYST_THRESH (i.e. in range 318) and the loss ratio is greater than UPPER_SPAN_THRESH (i.e., in range 328), the two factors also compete to determine whether the transmission rate actually increases or decreases.

Based on the loss ratio and excess loss rate of a sequence of packets, rate controller 116 computes two factors, a span factor (FACTOR_SPAN) and a loss factor (FACTOR_LOSS). These factors are in a range -1.0 to 1.0. If the loss ratio $(1-L_S)$ exceeds the upper span loss ratio threshold, UPPER_SPAN_THRESH, the span factor is a normalized amount by which it exceeds the threshold. In particular, the span factor is computed as $$FACTOR\_SPAN=((1-L_S)-UPPER\_SPAN\ THRESH)/(1.0-UPPER\_SPAN\_THRESH)$$

If the loss ratio is less than the lower span loss ratio threshold, then the span factor is computed as $$FACTOR\_SPAN=-(1-L_S)/LOWER\_SPAN\_THRESH$$

Note that in the first case, the computed span factor is in the range 0 to 1.0 while in the second case, the computed span factor is in the range -1.0 to 0.

Rate controller 116 computes the loss factor in a similar manner. In particular, if the excess loss rate exceeds the loss hysteresis threshold, then the loss factor is computed as $$FACTOR\_LOSS=((L-L_0)-HYST\_THRESH)/(1-HYST\_THRESH)$$

Similarly, if the excess loss rate is lower than the negative loss hysteresis threshold, the loss factor is computed as $$FACTOR\_LOSS=((L-L_0)+HYST\_THRESH)/(1-HYST\_THRESH)$$

Note that in the first case, the computed loss factor is in the range 0 to 1.0 while in the second case it is in the range -1.0 to 0.

To illustrate this calculation, consider a pair of values illustrated by the point 336. FACTOR_SPAN is negative with a magnitude equal to the ratio of the length of line segment 332 to the length of range 328, and FACTOR_LOSS is negative with a magnitude equal to the ratio of the length of line segment 334 to the length of range 314.

Having computed FACTOR_LOSS and FACTOR_SPAN, rate controller 116 computes a weighted average of the these factors to derive a combined factor. The relative weighting of the factors is configurable, according to a span ratio weight, W, which is in the range 0.0 to 1.0. The combined factor is computed as $$FACTOR=W*FACTOR\_SPAN+(1-W)*FACTOR\_LOSS$$

A value of W=0.67 for the span ratio weight has been used successfully.

If the combined factor is positive, then the rate is increased. If the factor is negative, the rate is decreased. Specifically, if FACTOR>0 and the current rate is R_OLD, then the new rate, R_NEW, is computed as $$R\_NEW=(1+FACTOR/CHANGE\_FACTOR\_UP*R\_OLD$$

If FACTOR<0, then R_NEW is computed as $$R\_NEW=(1+FACTOR/CHANGE\_FACTOR\_DOWN)*R\_OLD$$

The values of approximately 2.0 and 1.75 for the CHANGE_FACTOR_UP and CHANGE_FACTOR_DOWN, respectively, have been used successfully. These values determine time constants of rate in creases or decreases. Using these values, R_NEW is within the approximate range of 0.4 to 1.5 times R_OLD.

After computing R_NEW according to the formulas above, R_NEW is limited to be within a predetermined range from a minimum rate to a maximum rate. The minimum rate is a configurable constant rate. A value of 500 bytes/second can be used. The maximum rate is set based on the maximum rate that is negotiated when connections are established between the local and the destination node.

The above procedure is only applied if the loss rate, L, for a sequence of packets, is above a loss threshold, LOSS_THRESH. If L<LOSS_THRESH, then the rate is increased according to $$R\_NEW=(1+1/CHANGE\_FACTOR\_UP)*R\_OLD$$

and limited by the maximum predetermined rate. A value of 0.06 for LOSS_THRESH has been used successfully. In this way, the rate increases up to the maximum while the absolute loss rate is low.

Adjustment Periods

This rate updating procedure described above is applied to successive sequences of sent packets. Periodically, every dt seconds, a rate adjustment is considered by rate controller 116. The update time, dt, is adapted to each destination and kept at a value of approximately 6 times the round-trip time of communication to the destination and back. Since the rate adjustment relies on estimates of the loss rate and the loss ratio, if fewer than a minimum number of packets, MIN_PACKET_THRESH, have been sent since the rate adjustment, the rate adjustment is deferred for another dt seconds. A value of 8 for MIN_PACKET_THRESH has been used successfully.

After each dt seconds, rate controller 116 updates its average loss rate, $L_0$, to be the ratio of the number of packets that were successfully received to the number of packets that were sent. Alternate averaging approaches, such as a decaying average can be used. Rate controller 116 also updates its estimate of the round-trip time to the destination.

Note that the above technique relies on the receiving node sending selective acknowledgments of packets to the sending node. Referring back to FIG. 2, after packets 3 and 4 are lost, the receiving network node receives packet 5. The receiving node acknowledges receipt of packet 5. This acknowledgment allows the sending node to determine that packets 3 and 4 have been lost. At the end of every dt seconds interval, the controller 116 only considers packets up to the most recently acknowledged packet. Therefore, packets that are still "in flight" are not considered.

Connection and Rate Adjustment Procedures

Figure 4:
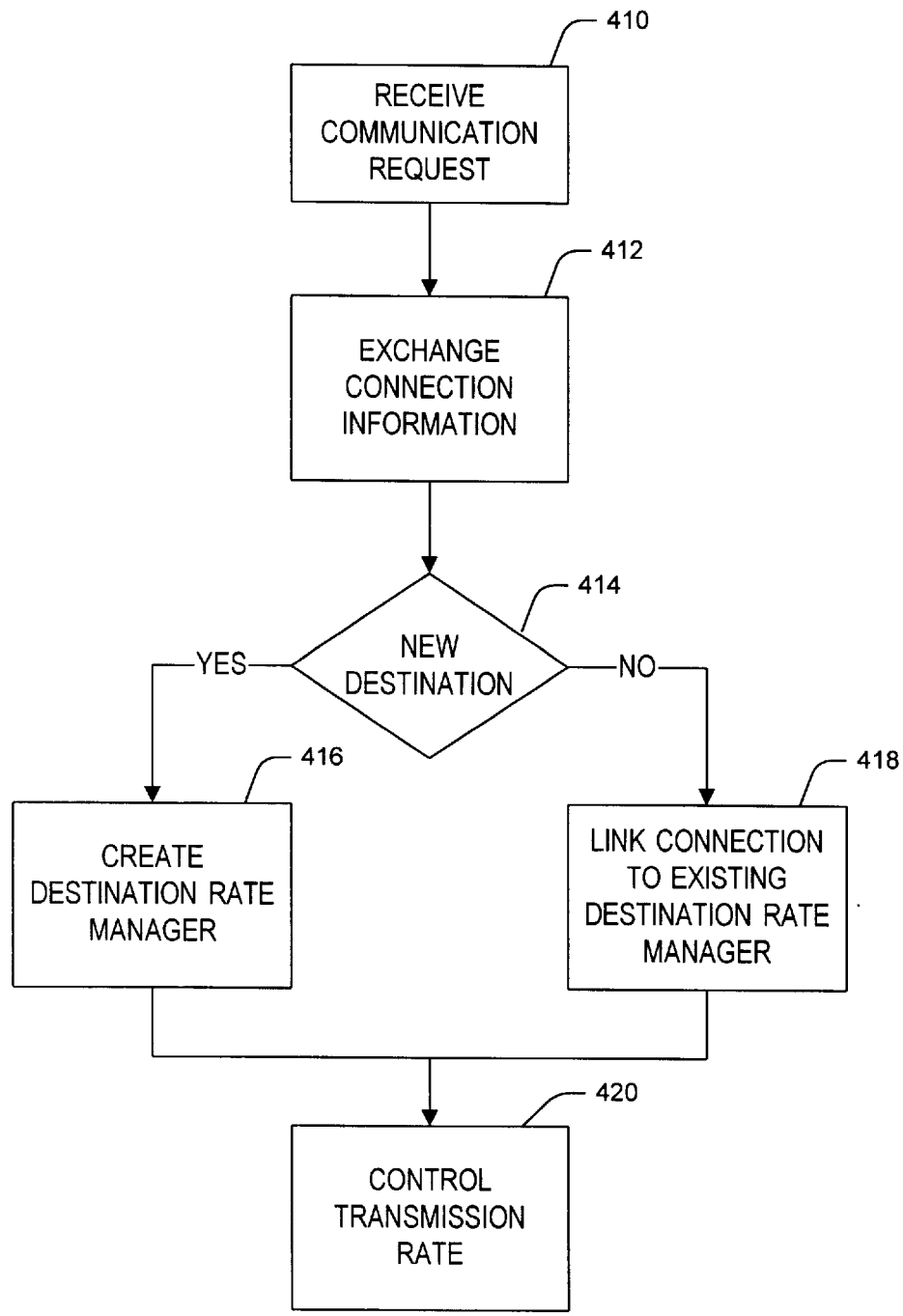
FIG. 4 is a flowchart of a connection procedure.
Figure 5:
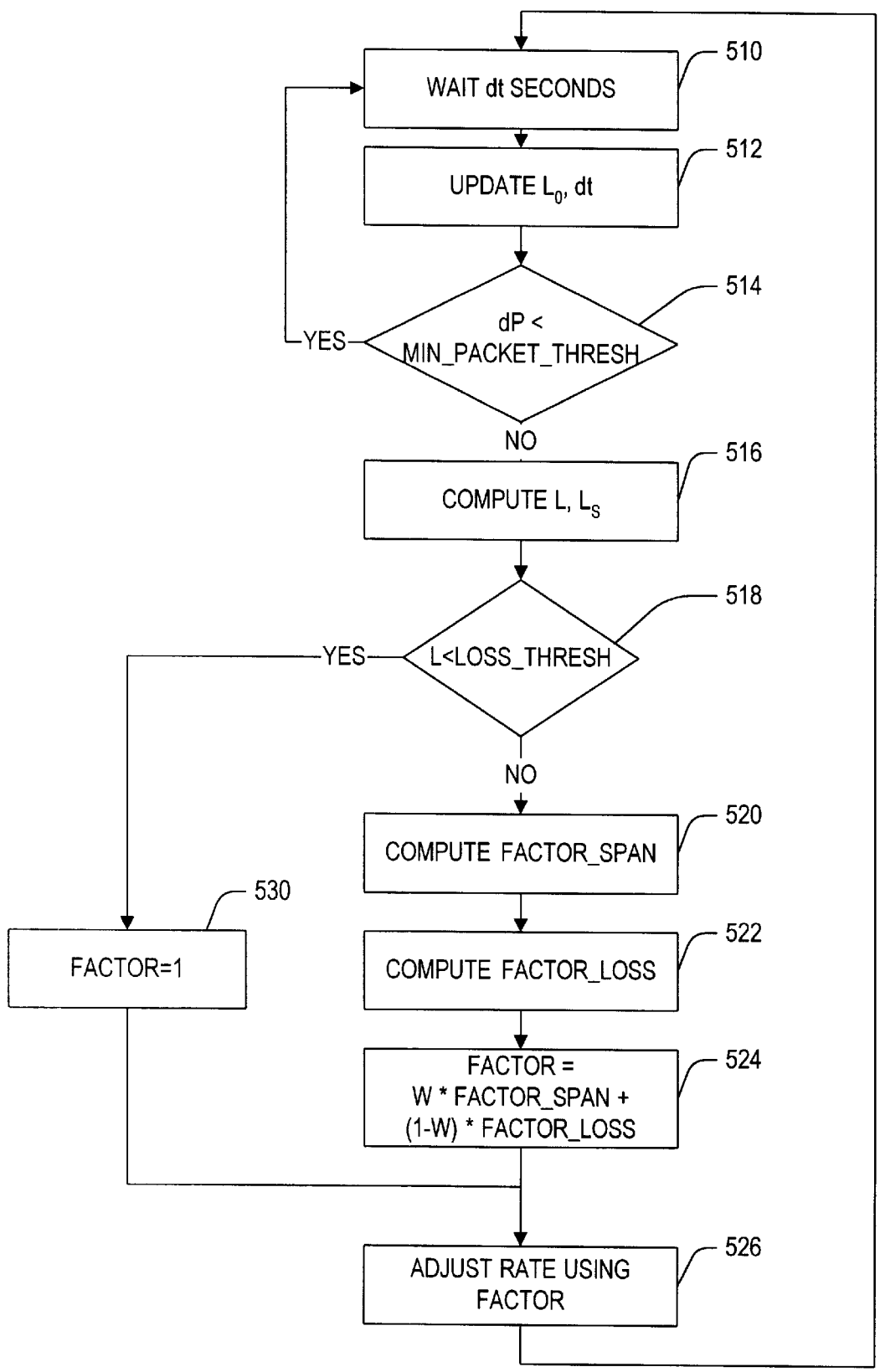
FIG. 5 is a flowchart of a rate adjustment procedure.

The connection procedure and subsequence rate adjustment is summarized in the flowcharts shown in FIGS. 4 and 5. Referring to FIG. 4, transport layer 114 (FIG. 1) receives a request to establish a data path with destination network node (step 410). The transport layer exchanges connection information with the destination node (step 412). Included in that information is the maximum data transmission and receiving rates supported by each of the network nodes. If there is no other connection to the destination node (step 414), a new destination rate manager is created (step 416). As is described more fully below, the destination rate manager contains information needed to control the transmission rate to a particular destination. If other connections are active to this destination, the connection is linked to an existing destination rate manager (step 418). The transmission rate to the destination node is then controlled by the transport layer using the destination rate manager for that destination (step 420).

The rate adjustment procedure for a particular destination is summarized in the flowchart shown in FIG. 5. After a communication session is set up, rate controller 116 (FIG. 1) waits for the expiration of a dt duration interval (step 510). The rate controller updates the long term packet loss rate, $L_0$, using the most recent sequence of sent packets, and updates the rate update time, dt, based on the round-trip time (step 512). If the number of packets sent since the last rate update is less than a threshold (step 514) the controller returns to wait for the expiration of another interval (step 510). Otherwise, based on the sequence of sent packets since the last rate update, the rate controller computes the loss rate, L, and the loss ratio, $L_S$ (step 516). If the loss rate is not less than a threshold (step 518), the controller computes FACTOR_SPAN (step 520) and FACTOR_LOSS (step 522) according to the formulas presented above, and then combines these to compute the overall FACTOR (step 524). If, on the other hand, the loss rate is less than the threshold (step 518) FACTOR is set to 1. Based on the computed FACTOR, the controller then adjusts the transmission rate (step 526) according to the formulas presented above. The rate controller then returns to wait for the end of another dt interval (step 510).

Transport Layer Modules

Figure 6:
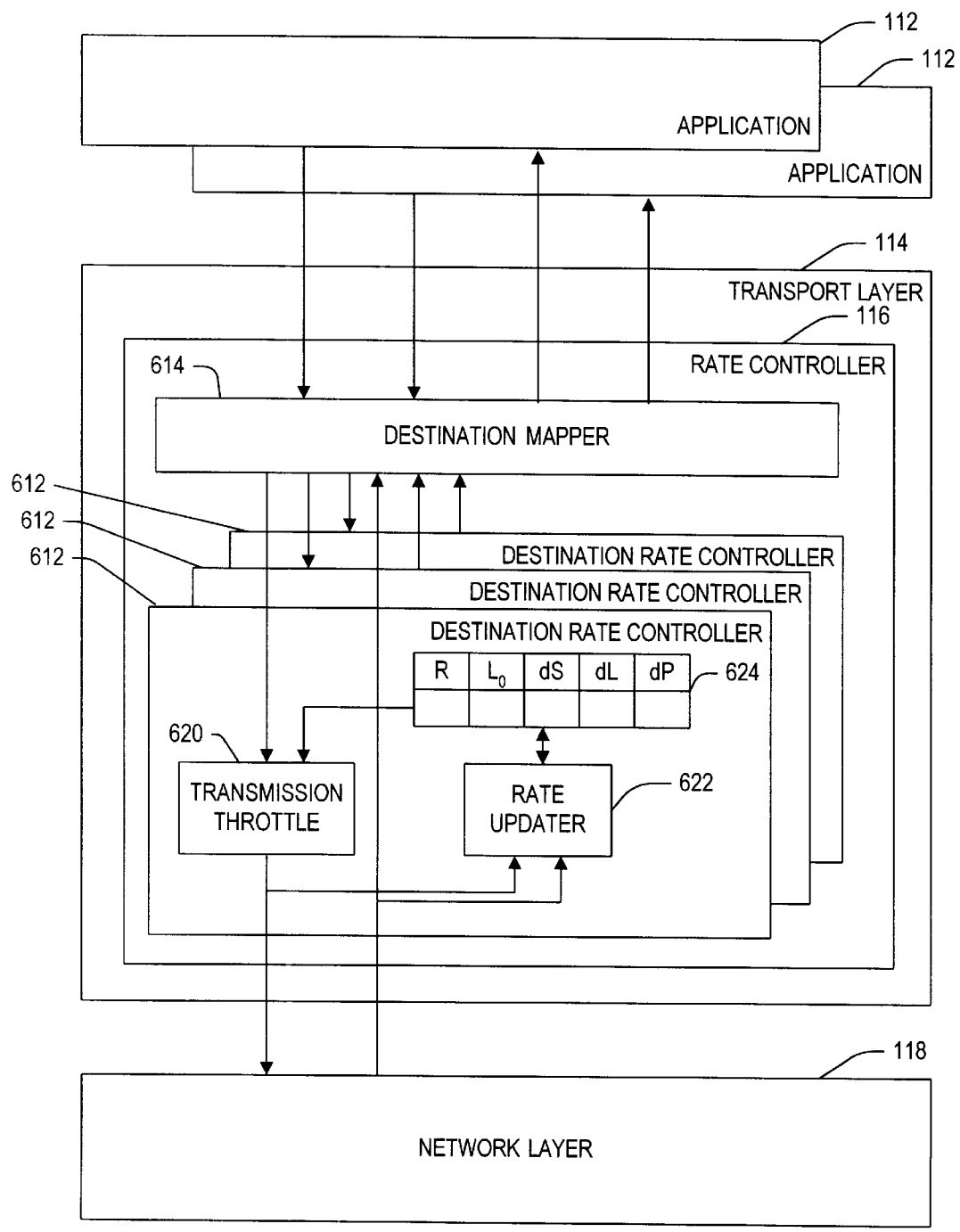
FIG. 6 shows software elements of a rate controller.

Referring to FIG. 6, the controller 116 includes several modules. Transport layer 114 supports connections from multiple applications 112. Each application can concurrently have open connections to multiple destinations. Communication to and from each destination passes through rate controller 116 in transport layer 114.

Rate controller 116 is implemented using a destination mapper 614 through which all connections pass, and a single destination rate controller 612 for each destination with which any application 112 is communicating. Destination rate controllers 612 are created when an initial connection to a new destination is established (FIG. 4, step 418). Subsequent connections to the same destination on behalf of any application 112 use the same destination rate controller 612 (FIG. 4, step 418). Once all connections to a destination are closed, the destination rate controller for that destination is "destroyed." Destination rate controllers are implemented as C++ objects.

When an application 112 sends a packet of data to a destination, that packet passes from the application to destination mapper 614. Based on the destination, destination mapper 614 passes the data to a particular destination rate controller 612.

Within each destination rate controller 612, a transmission throttle 620 limits the rate of data transmission to the destination. Transmission throttle 620 is implemented by periodically (e.g., every 200 milliseconds) determining how much pending data for each destination can be sent to network layer 118 without exceeding the calculated transmission rate for that destination. Data that cannot be sent is buffered by transmission throttle 620. In each interval, transmission throttle 620 increments a "credit" based on the duration of the interval and the transmission rate and decrements the credit based on the amount of data sent. The amount of data sent is limited to keep the credit non-negative. The credit is bounded to not grow beyond a specific amount, in particular, it is bounded by the transmission rate times the duration of two update intervals.

In the return direction, data from remote nodes pass from network layer 118 to destination mapper 614 and then to the destination applications 112.

Each destination rate controller 116 includes a table 624 that includes information needed to control the rate of that destination. In particular, table 624 includes the current maximum transmission rate (R), the current estimate of average loss rate ($L_0$), the number of packets sent since the last rate update (dP), the number of packets lost since the last rate update (dL), and the number of spans of lost packets since the last rate update (dS). Transmission throttle 620 limits the number of packets so as not to exceed the current maximum transmission rate (R). Destination rate controller 612 also includes a rate updater 622 which monitors the packet transmissions and acknowledgments to and from its corresponding destination, and updates table 624 based on the rate and pattern of lost packets.

Alternative software architectures of rate controller 116 can also be used. For instance, a single transmission throttle module and a single rate updater module can be used for all connections. Instead of creating separate destination rate controller objects, one for each destination, each with a separate table 624 holding information related to the rate control for that destination, a common table can be used associating each destination with information related to the rate control for that destination. The single transmission throttle and rate updater use and update appropriate records in the common table based on the destination of communication.

Figure 7:
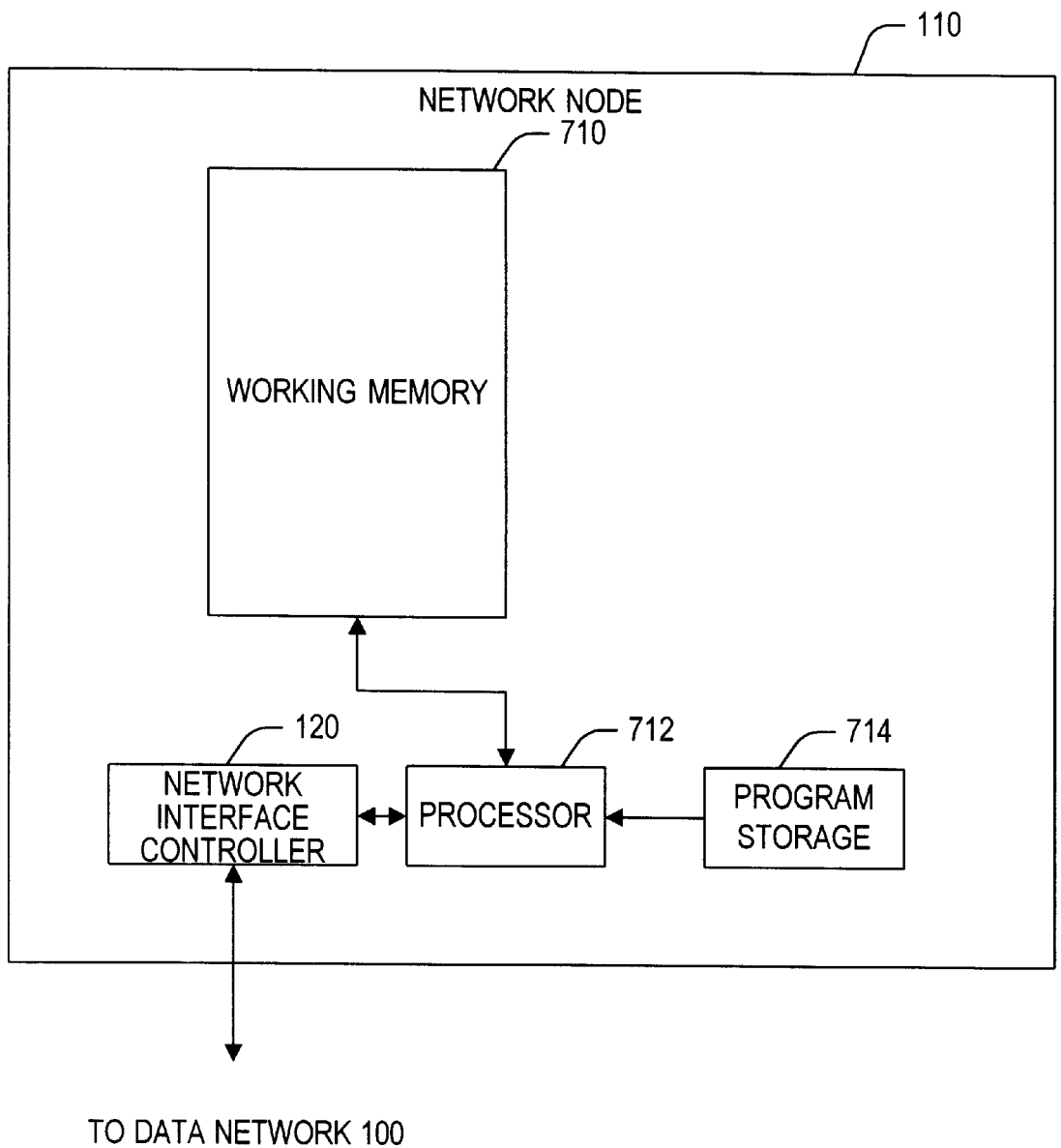
FIG. 7 shows hardware elements of a network node.

Referring to FIG. 7, a network node implements the software modules shown in FIG. 6. The network node includes a processor 712 and working memory 710. Working memory holds rate table 620 (FIG. 6) as well as the code that implements transmission throttle 610 and rate updater 612, as well as other software modules. Network node also includes permanent program storage 714 and network interface controller 120 which coupled the network node to data network 100.

In the above embodiment, transmission rate is controlled separately for each destination node. Alternatively, transmission rate can be controlled for other groupings of connections and congestion statistics computed for those groups. For example, individual connections can be individually controlled, or groups of connections that share particular characteristics can be controlled together.

Although not shown, transport layer 114 can include other modules that serve functions that are well known to one skilled in the art. In particular, transport layer 114 can include an error control module that provides a reliable data stream to application 112, and a flow control module to limit the amount of unacknowledged data that is sent on each individual connection.

Other embodiments can use alternative indicators of congestion or other ways of combining the loss rate and loss ratio indicators. For instance, quantized span and loss factors can be computed rather than computing the floating point versions described above. Also, rather than setting specific thresholds for the indicator variables, other functions mapping the indicator variables and a current rate to a new rate can be used.

It is to be understood that the foregoing description is intended to illustrate and not limit the scope of the invention, which is defined by the scope of the appended claims. Other aspects and modifications are within the scope of the following claims.

What is claimed is:

1. A method for controlling congestion in a data communication network by controlling a transmission rate at which a source of data transmits data onto a data network, said method comprising:

deriving values for a plurality of different types of statistical measures related to delivery of data transmitted from the source, each of said plurality of different types of statistical measures providing an indication of congestion on the data network;

adjusting the transmission rate from the source in response to a combination of the derived values for the plurality of different types of statistical measures.

2. The method of claim 1 further comprising:

forming a group of data streams for transmission from the source;

transmitting data from the group of data streams; and accepting acknowledgments of receipt of the transmitted data from the group of data streams; and wherein deriving the values for the plurality of different types of statistical measures related to delivery of the data transmitted from the source includes monitoring the transmissions of the data and monitoring the acknowledgments of receipt of the data.

3. The method of claim 2 wherein deriving the values further includes combining acknowledgements for different data streams in the group of data streams.

4. The method of claim 2 wherein forming a group of data streams includes forming a group of data streams which have a common destination on the data network.

5. The method claim 1 further comprising:

computing a maximum transmission rate as a function of the derived values for the plurality of different types of statistical measures; and wherein adjusting the transmission rate includes limiting the transmission rate to the computed maximum transmission rate.

6. The method of claim 1 wherein deriving the values for the plurality of different types of statistical measures includes monitoring a rate of data loss and a pattern of data loss.

7. The method of claim 6 wherein monitoring the pattern of data loss includes monitoring lengths of sequences of lost data.

8. The method of claim 1 wherein deriving the values for the plurality of different types of statistical measures and the adjusting of the transmission rate is performed in each of a sequence of time intervals.

9. The method of claim 1 wherein adjusting the transmission rate includes:

computing a first factor related to a rate of data loss;

computing a second factor related to lengths of data loss;

combining the first and second factors;

adjusting the transmission rate according to the combined factor.

10. The method of claim 1 wherein the plurality of different types of statistical measures includes a rate of data loss and lengths of data loss.

11. The method of claim 1 wherein the plurality of different types of statistical measures includes a rate of data loss and a pattern of data loss.

12. Software stored on a computer readable medium for causing a computer to perform the functions of:

deriving values for a plurality of different types of statistical measures related to delivery of data transmitted from a source of data over a data network, each of said plurality of different types of statistical measures providing an indication of congestion on the data network;

adjusting the transmission rate from the source in response to a combination of the derived values for the plurality of different types of statistical measures.

13. The software of claim 12 further causing the computer to perform the functions of:

forming a group of data streams for transmission from the source;

transmitting data from the group of data streams; and accepting acknowledgments of receipt of the transmitted data; and wherein deriving the values for the plurality of different types of statistical measures related to delivery of the data transmitted from the source includes monitoring the transmissions of the data and monitoring the acknowledgments of receipt of the data.

14. The software of claim 12 wherein the plurality of different types of statistical measures includes a rate of data loss and lengths of data loss.

15. The software of claim 12 wherein the plurality of different types of statistical measures includes a rate of data loss and a pattern of data loss.

16. A congestion control apparatus comprising:

a rate updater for determining a maximum rate of data transmission to a destination over a data network, the rate updater determining the maximum rate using a combination of values for a plurality of different types of statistical measures derived from communication with the destination, each of said plurality of different types of statistical measures providing an indication of congestion on the data network;

storage associating the destination with the determined maximum rate of data transmission; and a transmission throttle for limiting a rate at which data is transmitted to the destination based on the stored maximum rate.

17. The apparatus of claim 16 wherein the plurality of different types of statistical measures includes a rate of data loss and lengths of data loss.

18. The apparatus of claim 16 wherein the plurality of different types of statistical measures includes a rate of data loss and a pattern of data loss.

* * * * *